United States Patent [19]
Abello

[11] 3,897,757
[45] Aug. 5, 1975

[54] CONVERSION DEVICE ENABLING A GASOLINE ENGINE TO BE FUELED WITH HYDROGEN

[75] Inventor: Lawrence Abello, Bombay, India

[73] Assignee: Canadian Jesuit Missions, Toronto, Canada

[22] Filed: Feb. 16, 1973

[21] Appl. No.: 332,815

[30] Foreign Application Priority Data
Oct. 20, 1972  Canada .............................. 154350

[52] U.S. Cl. .......................... 123/1 A; 123/DIG. 12
[51] Int. Cl. ............................................ F02b 75/12
[58] Field of Search .......... 123/120, 121, 1 A, 129, 123/139 H, 27 GE, 90.1, DIG. 12

[56] References Cited
UNITED STATES PATENTS

| | | | |
|---|---|---|---|
| 1,340,444 | 5/1920 | Hayes | 123/129 |
| 2,852,013 | 9/1958 | Davids | 123/120 |
| 2,937,634 | 5/1960 | Kelseaux | 123/DIG. 12 |
| 3,572,297 | 3/1971 | Murray | 123/1 A |
| 3,665,896 | 5/1972 | Crehore | 123/1 A |
| 3,665,896 | 5/1972 | Crehore | 123/DIG. 12 |

FOREIGN PATENTS OR APPLICATIONS

| | | | |
|---|---|---|---|
| 865,413 | 4/1961 | United Kingdom | 123/120 |
| 831,429 | 9/1938 | France | 123/DIG. 12 |

*Primary Examiner*—Charles J. Myhre
*Assistant Examiner*—R. H. Lazarus
*Attorney, Agent, or Firm*—Spencer & Kaye

[57] ABSTRACT

A mechanism allows a simple gasoline engine to be converted to run using hydrogen as a fuel by the introduction of a pulse of hydrogen during the intake stroke. The mechanism is such that an engine may use either fuel at will but preferably simple changes to the cylinder head allow an engine to be converted into a high compression engine using hydrogen alone because of the greater efficiency.

7 Claims, 6 Drawing Figures

CONVERSION DEVICE ENABLING A GASOLINE ENGINE TO BE FUELED WITH HYDROGEN

This invention relates to gasoline engines, and in particular to stationary engines. Such engines are used on outlying farms for pumping water, generating electricity and like tasks, and are usually of the four stroke, single cylinder type.

It is well known that such engines have disadvantages although their use is exceedingly widespread. For instance, the hydrocarbon nature of gasoline fuel requires that such engines be decarbonized regularly; due also to the hydrocarbon fuel the exhaust is noxious - that is, the carbon monoxide which is inevitably generated can build up to lethal concentrations in enclosed spaces; thus, exhaust pipework is needed if the engine is to be serviced while running, as a weatherproof shelter is required for ignition protection. Miscellaneous hydrocarbons in the exhaust also pollute the atmosphere, as is also well known.

Many proposals have been made to use hydrogen as a fuel, but these have required such elaborate modifications as to be virtually specially built engines, typical examples being U.S. Pats. Nos. 2,183,674; 3,471,274 and 3,572,297.

Such prior art so deeply underscores the likelihood of detonation, and the difficulty of efficient mixing that the possibility of using hydrogen as fuel in a simple engine would seem to be remote.

An object of this invention is to solve these problems by injecting a charge of unmixed hydrogen during the intake stroke. This not only ensures good mixing and inhibits detonation and preignition but also allows a simple conversion from a gasoline engine.

A more limited object of this invention is to provide a dual fuel engine - that is, one that will run on either hydrogen or gasoline.

The invention will be more easily understood after reading the following disclosure and referring to the drawings which illustrate, by way of example, an engine which incorporates an embodiment of the invention.

Figure 1:
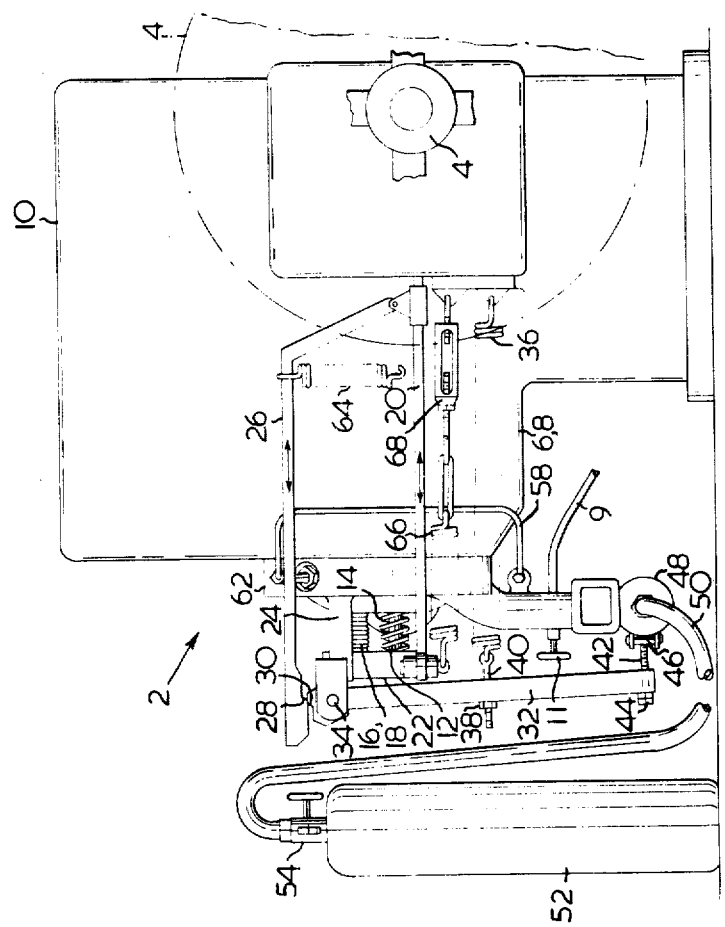
FIG. 1 is a side elevation of a typical horizontal one cylinder engine modified according to the teachings of the invention.
Figure 2:
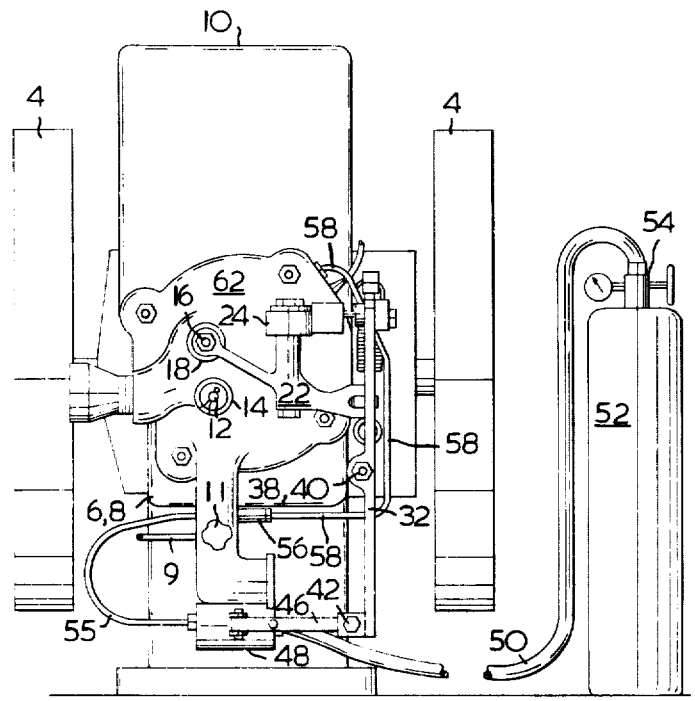
FIG. 2 is a front end view of the engine looking on the cylinder head.

In these Figures the usual components of such an engine 2 will be easily identified. Flywheel 4 is driven by a crank and piston, not shown, because the cylinder is surrounded by an integral crank case and cylinder jacket 6, 8. A header tank 10 holds a reservoir of cooling water for the cylinder. The engine is actually a John Deere, type "E" 1½ horsepower gasoline engine, but the conversion to be described below can be carried out on any similar engine. For this reason details of standard fittings, such as the ignition, the simple carburetor, manual choke and the like, will be omitted from the description. However, the gasoline line 9 with the carburetor needle valve handwheel adjuster 11 have been numbered for easy identification.

In this engine the inlet valve 12 has a light spring 14 to bias it shut, but does not have an operating rod and is drawn open by suction on the inlet stroke. The exhaust valve 16 has a fairly heavy spring 18 to keep it tightly shut and is operated by a push rod 20 through a rocker arm 22 mounted on bracket 24. The push rod is driven by a cam through a 2-to-1 reduction gear from the crankshaft on which flywheel 4 is mounted.

Turning to the modification, an operating arm 26 is pivotally mounted on the push rod 20. This arm has a latch 28 on it which engages catch 30 on the end of trigger arm 32. This trigger arm is mounted on shaft 34 which fits into a bracket bolted to the rocker arm mounting bracket 24.

The trigger arm 32 is functionally a light hammer with a predetermined impulse given to it by a tensioning trigger spring 36. The setting of this spring can be adjusted to vary the impulse by adjustment nut 38 on eyebolt 40, and is normally such that the impulses resemble tapping rather than repeated hammer blows.

A striker bolt 42, with an adjustable nut 44, is located near the end of the trigger arm 32 and when the latch 28 releases the trigger arm the striker taps a pivotally mounted metering valve depression arm 46, momentarily depressing it to operate as by a tapping impulse, a spring loaded metering valve 48. Trigger arm 32 strikes the valve depression arm 46 with a force which depends only on the tension of spring 36 and its own mass and therefore the impulse which it produces for opening the valve is independent of the engine speed. In this way, the valve is opened for a brief period which is substantially independent of the engine speed.

This metering valve is fed by a line 50 from hydrogen bottle 52, or any other suitable supply of pressurized hydrogen gas. A pressure regulator 54 is set to 120 psi so that a regulated hydrogen pressure is established at the metering valve 48. When this valve is depressed momentarily, by reason of the impulse behind striker bolt 42, a burst of hydrogen passes through line 55, non-return valve 56 and line 58, which is a copper tube, directly into the combustion chamber 60 of the cylinder head 62, see FIG. 4.

The basic operation of the engine will now be understood. When running on hydrogen is desired the gasoline supply is turned off and the hydrogen supply is turned on. Preferably the spark is retarded somewhat, for optimum operation on hydrogen. When reverting to gasoline the spark should be advanced, that is timed in accordance with the spark timing mark on the engine flywheel.

Figure 3A:
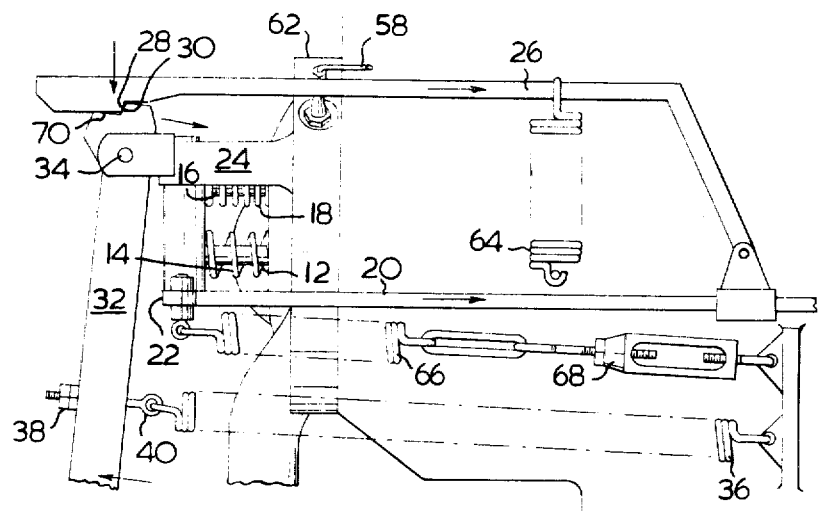
FIGS. 3a and 3b are an enlarged view of a portion of FIG. 1 with the mechanism in two different positions.

When the engine is cranked to start it, the first movement of the exhaust valve push rod 20 towards the crankshaft of flywheel 4 draws operating arm 26 with the push rod and the latch 28 of the operating arm 26 engages catch 30 on the end of trigger arm 32 and is held in place by spring 64; this position is seen at FIG. 3a.

To incorporate the invention in this particular engine, it happens that another spring 66 is needed with a turnbuckle 68 to adjust it. The reason is that the exhaust valve push rod 20 also operates the igniter by further travel after the exhaust valve itself has closed, and the torsional spring (not shown to avoid confusion — it fits round about the circular bearing portion of rocker arm 22) is not strong enough to overcome the loading of tensioning trigger spring 36. Although this spring 36 is quite light — it only has to accelerate the trigger arm to provide a tapping type of impulse — it acts at such a mechanical advantage that it can hold the push rod 20 off from following the operating cam surface fully; although it is not strong enough to hold the exhaust valve open, it can and does prevent the lighter torsion spring from urging the push rod further to operate the igniter (also omitted for clarity).

Figure 3B:
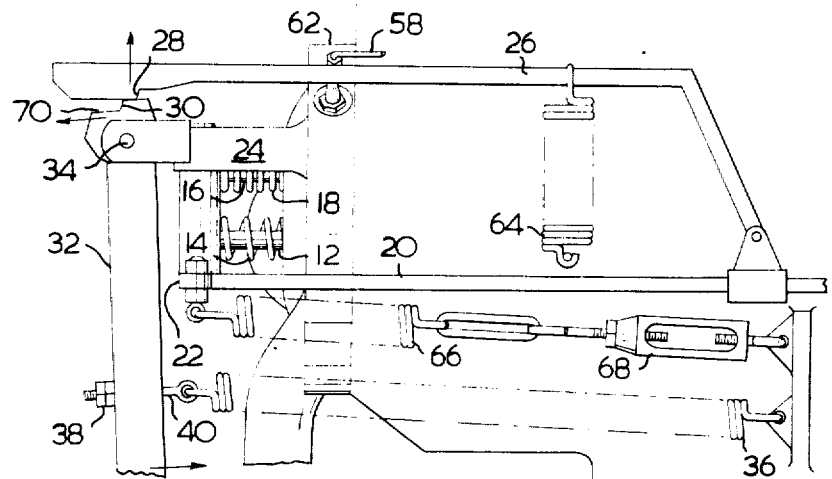

As the exhaust valve push rod 20 moves towards the crankshaft of flywheel 4, the elbow 70 of the trigger arm catch 30 pushes the latch 28 off the catch and the trigger spring 36 accelerates the trigger arm so that bolt 42 taps the metering valve depression arm 46 when the inlet stroke has begun and the burst of hydrogen actually enters the cylinder at about 40° after TDC. This position is shown in FIG. 3b. It will be understood that triggering the tapping impulse by the exhaust valve push rod with its continuing travel beyond exhaust valve closure allows a range of timing to be achieved.

It may be necessary to raise or lower the regulator pressure to ensure that the mixture is neither too rich nor too lean; the trigger arm spring 36 is also provided with an adjustable feature so that the impulse can be varied, and to some extent these represent alternative adjustment of mixture strength. The igniter adjustment is, of course, independent of mixture strength, and depends upon which fuel the engine is using.

Figure 4:
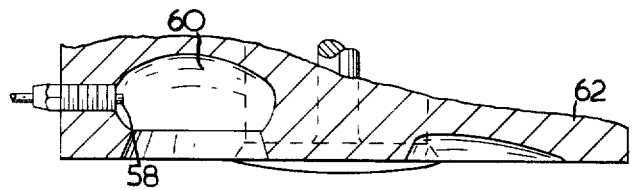
FIG. 4 is a scrap section view of the cylinder head.
Figure 5:
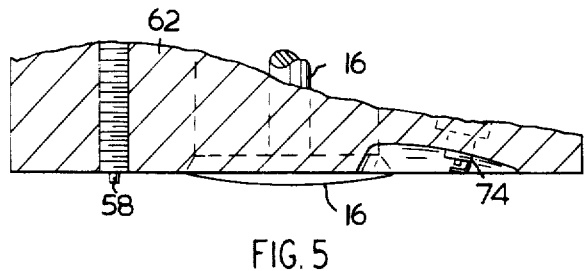
FIG. 5 is the cylinder head of an alternative embodiment.

The above describes a dual fuel type of engine - in the sense that it can use both types of fuel. However, in another high compression embodiment the engine, although only able to use hydrogen, has a greater fuel efficiency by the substitution of a high compression head. By high compression a ratio higher than 12 to 1 is meant and a suitable ratio has been found to be 13:1. This is achieved by removing the igniter (not shown) and then filling in the combustion chamber 60. Instead of the igniter which functions as both a spark plug and breaker points, spark plug 74 was provided and the original magneto was replaced by a magneto which contained breaker points. The low compression head and the high compression modification are illustrated in FIGS. 4 and 5.

Other mechanical adjustments were made which do not concern the invention directly; for instance, a liner was inserted to reduce the displacement. It was considered that raising the compression ratio from the original 4:1 to 13:1 without other modification would merely invite premature failure of a connecting rod, main bearings or crankshaft which had been designed for the lesser duty. Moreover the 13:1 ratio does not represent the thermodynamic limit as a few tests indicated that the hydrogen did not ignite spontaneously even at a 16:1 ratio in contrast with the prior art teachings.

Thus, while there has been shown and described what is at present considered the preferred embodiment of the invention, it will be obvious to those skilled in the art that various changes and modifications may be made therein without departing from the invention as defined by the appended claims.

I claim:

1. A positive displacement internal combustion engine adapted to use hydrogen gas comprising:
    means for controlling the admission of air to a combustion space thereby defining an air intake stroke;
    a hydrogen supply means;
    means for connecting said hydrogen supply to said combustion space;
    means for predetermining a time during the air intake stroke;
    a normally closed valve means in said hydrogen supply connecting means;
    means for opening said valve means for a brief period which is substantially independent of the engine speed; and
    means connecting said time predetermining means to said valve opening means whereby a pulse of hydrogen is produced and conveyed to said combustion space, at a predetermined time during the air intake stroke.

2. An engine as claimed in claim 1 wherein the compression ratio is low enough to allow gasoline to be used as an alternative fuel.

3. An engine as claimed in claim 1 wherein the compression ratio is high enough to increase cycle efficiency above that attainable in a gasoline fueled engine.

4. An engine as claimed in claim 1 wherein said valve means comprises a spring loaded plunger operated metering valve and said valve opening means is adapted to deliver an impulsive blow to the plunger of the valve means.

5. An engine as claimed in claim 1, wherein said engine comprises an exhaust valve and operating means therefor, and wherein the means for predetermining a time during the intake stroke comprises a means connected to the exhaust valve operating means, whereby production of a pulse of hydrogen is initiated by the return stroke of said exhaust valve operating means.

6. An engine as claimed in claim 1 wherein said engine comprises an exhaust valve and operating means therefor, and wherein said valve means comprises a spring loaded plunger operated metering valve, and said valve opening means comprises a trigger arm having a catch and a latch means connected to the exhaust valve operating means, said latch means being adapted to engage the trigger arm catch as the exhaust valve operating means undergoes a return stroke, whereby the production of a pulse of hydrogen gas is initiated.

7. An engine as claimed in claim 6 wherein an elbow portion of the trigger arm forms a releasing means for releasing the catch.

* * * * *